Aug. 29, 1967        J. A. MEINHARD        3,338,542

REPLACEABLE CUSHIONING PAD

Filed July 28, 1965

INVENTOR
JOSEPH A. MEINHARD

BY Barthel & Bugbee

ATTORNEYS

United States Patent Office 3,338,542
Patented Aug. 29, 1967

3,338,542
REPLACEABLE CUSHIONING PAD
Joseph A. Meinhard, 8995 Kinloch,
Detroit, Mich. 48239
Filed July 28, 1965, Ser. No. 475,476
5 Claims. (Cl. 248—345.1)

ABSTRACT OF THE DISCLOSURE

A cushioning pad composed of a base support, either of substantially rigid laminated construction (FIGURES 1 and 2), such as plywood, or a channel member (FIGURE 3) above which is secured a resilient foam plastic cushion core, this assembly being surrounded by an envelope of resilient material, such as the synthetic rubber known commercially as Neoprene, with an optional loosely-woven fabric mesh layer inside it with the synthetic rubber penetrating and interlocking with the interstices of the fabric. Attachment fasteners are secured to the base support either by driving (FIGURE 2) or welding (FIGURE 3).

Background of the invention

This invention relates to shock-absorbing devices and, in particular, to dunnage devices.

Hitherto, the shipment of delicate or easily bent, indented or damage parts, such as sheet metal automobile body components, windshields and the like, has resulted in great damage as a result of the difficulty of cushioning these parts during shipment and handling. The provision of loose dunnage has resulted in wastage thereof as well as in high labor costs in installing the loose dunnage, and much of such dunnage is not re-usable. Such dunnage, moreover, is non-productive and thus constitutes an additional but necessary expense in transportation or handling. The present invention provides a replaceable dunnage bar cushioning pad which is easily attachable and detachable to a suitable supporting structure, re-usable and suitable also for use as a bump rail for personnel protection inside vehicles or building structures, yet which at the same time possesses great strength, durability and length of useful life.

Summary of the invention

This invention provides a replaceable dunnage bar cushioning pad which can be made in any convenient length and which is readily attachable to and detachable from an existing supporting structure, such as in shipping containers, on material handling equipment or in vehicles, primarily of the cargo type, and contains cushioning material surrounded by a tough yet yieldable envelope structure which sustains repeated compression and indentation without failure and without exposing the cushioning material.

This pad is reinforced by a structurally strong base support serving as an abutment between the cushioning material and the supporting structure, such a base support consisting, for example, of a plywood strip or of a metallic channel member.

In this pad the base support carries fasteners by which the dunnage bar is detachably secured to the supporting structure.

Other objects and advantages of the invention will become apparent during the course of the following description of the accompanying drawing, wherein.

Figure 1:
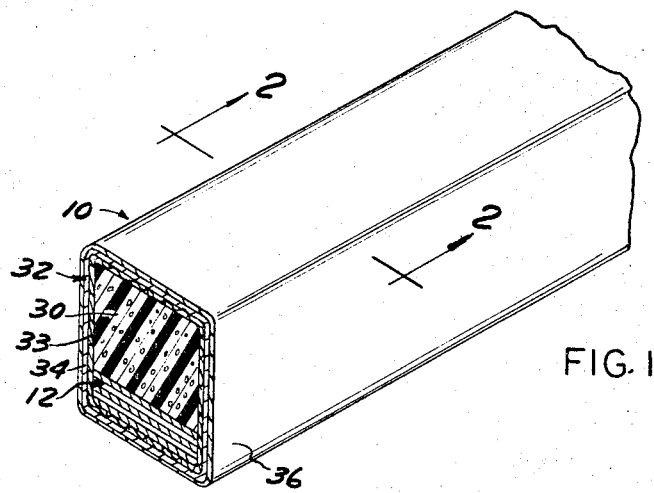
FIGURE 1 is a perspective view of a short length of replaceable dunnage bar or cushioning pad, with one end shown in cross-section, according to one form of the invention.

Referring to the drawings in detail, FIGURE 1 shows a replaceable dunnage bar or cushioning pad, generally designated 10, according to one form of the invention as consisting of an elongated base support 12, preferably of laminated construction such as of plywood or other suitable material. As shown, the base support 12 is substantially rigid and comprises a plywood bar or panel including five lamination strips 14 preferably of Douglas fir wood secured to one another by a suitable adhesive, many of which are known to the plywood industry. The exposed lower corner edges 16 and upper corner edges 18 of the strips 14 are beveled or chamfered to reduce the shearing or cutting effect which sharp corner edges would otherwise possess. Inserted in the base support 12 through holes 20 drilled or punched at intervals therealong are T-nuts 22 having flanged heads 24 with downwardly-extending prongs 26 penetrating the wood of the base support 12. The T-nut 22 is also provided with an internally-threaded bore 28 which receives the usual correspondingly-threaded screw (not shown) secured in any suitable manner to the supporting structure (not shown). The T-nut 22 thus serves as a fastener attachment member.

Mounted above the base support 12 and extending therealong as well as being adhesively secured thereto is an inner cushioning core 30 of suitable resilient material, such as resilient foam material of expanded synthetic plastic or synthetic rubber. For this purpose, rebonded urethane foam plastic of 7 to 8 pounds density and approximately 1½ inches thick has been found suitable and has provided adequate cushioning action. Optionally, expanded foam material of synthetic rubber or other resilient plastic may be used in place of the urethane foam plastic.

Enclosing both the base support 12 and the inner cushion 30 and extending around the opposite ends thereof is a tubular inner lining or core cover 33 preferably composed of nylon or cotton stockinette fabric or other loosely-woven mesh fabric, surrounding the base support 12 and inner core 30 except for holes 31 aligned with the holes 20 for the fasteners inserted therethrough into the T-nuts 22. This core cover 33 strengthens the inner core 30 and imparts to its resistance against shearing, rupture and flaking.

The above components are secured to one another with a self-curing adhesive, the ultimate bond strength of which exceeds the strength of the inner core 30, the inner lining 22, the intermediate layer 34 and the outer coating 36. Suitable adhesives containing a Neoprene synthetic rubber base giving an adhesive bond of these characteristics are known to those skilled in the art and are commercially available. Neoprene is a synthetic rubber. Overlying the core cover 33 is the intermediate protective layer 34 preferably of synthetic rubber, such as the above-mentioned Neoprene. This intermediate layer 34 is applied in such a manner as to first thoroughly impregnate the core cover 33 and interlock with the interstices between the warp and weft thereof and then to form a skin thereover preferably from 40 to 70 thousandths of an inch in thickness, and having holes 35 aligned with the holes 20 and 31 for fasteners (not shown).

Superimposed upon the synthetic rubber intermediate layer or skin 34 is an optionally-added outer coating 36 preferably of urethane rubber to provide resistance to abrasion, weather and ultra-violet deterioration and seving as a thin over-coating. This overcoating is preferably from one to five thousandths of an inch thick and, if desired, may be omitted from the under side or fastener side of the pad 10.

In the use of the invention, suitable holes are made in the supporting structure for screws or other suitable threaded fasteners, at intervals corresponding to the spacing of the fastener holes 20, 33 and 35. Screws or bolts are then inserted through the supporting structure holes into the threaded bores 28, thereby firmly securing the pad 10 to the supporting structure. The pad 10 is quickly and easily removed and replaced by reversing this procedure, such as where the pad has been damaged. During use, such as shipment, the pad 10 gives a resilient cushioning action which engages and protects the articles being shipped and impedes their movement. This greatly reduces the damage previously occurring during shipment, such as, for example, during the switching of freight cars in freight yards or marshalling yards.

Figure 2:
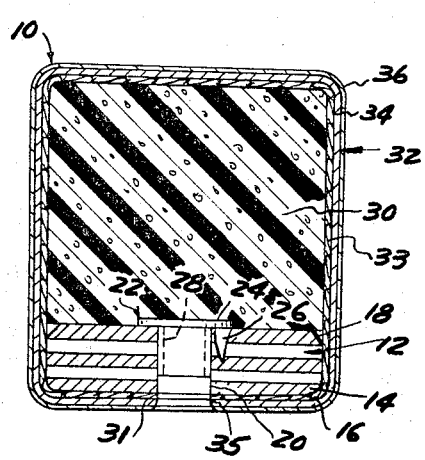
FIGURE 2 is a cross-section upon an enlarged scale of the dunnage bar or cushioning pad shown in FIGURE 1, taken along the line 2—2 therein.
Figure 3:
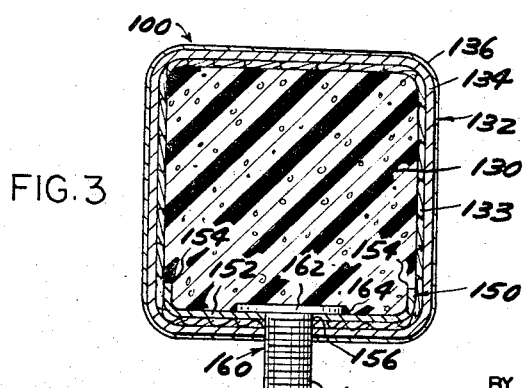
FIGURE 3 is a similar cross-section through a modification of FIGURES 1 and 2.

The modified dunnage bar pad 100 shown in FIGURE 3 is similar in most respects to the dunnage bar pad 10 shown in FIGURES 1 and 2, and similar parts are designated with the same reference numerals, increased by 100, in order to distinguish the parts but at the same time eliminate duplication of description. In place of the plywood base support 12, a channel member 150 of metal, such as cold-rolled steel, or synthetic plastic is subtituted and has a web portion 152 with upstanding flanges 154 extending along its longitudinal edges. The channel member 150 is drilled or punched at suitable intervals with holes 156 through which the shanks 158 of screws 160 project. The heads 162 of the screws 160 are disposed on the inner side of the channel member 150 and are welded or otherwise secured thereto as at 164 to prevent rotation or other displacement.

The use of the modified replaceable dunnage bar pad 100 is similar to that of the dunnage pad 10 as described above, hence need not be repeated. Instead of using screws inserted through holes in the supporting structure, however, the threaded shanks 158 of the screws 160 are inserted therethrough and secured by means of conventional threaded nuts. In place of the headed screws 150, it will be understood that threaded studs may optionally be used and also secured by welding or other suitable means to the channel member 150. In place of the T-nuts 22, it will also be understood that any other suitable conventional fasteners, of any suitable material, such as metal or plastic, may be used, and various commercial types thereof are available upon the open market.

It will be further understood that while the replaceable dunnage pad 10 or 100 of the present invention is conveniently made of elongated configuration for cushioning elongated articles or sets of articles, it may also be made in non-elongated shapes such as circular or rectangular to conform to other cushioning requirements, and it may also be provided with recesses to receive projections on the article or articles to be cushioned.

What I claim is:
1. A replaceable cushioning pad, comprising
a base support,
a cushion core element of resilient material secured to said base support,
an envelope structure of resilient material surrounding said base support and cushion element,
and fastener attachment components secured to said base support at intervals therealong, said base support comprising a substantially rigid laminated member interposed between said cushion core element and said envelope structure.
2. A replaceable cushioning pad, according to claim 1, wherein said laminated member comprises a plywood panel.
3. A replaceable cushioning pad, comprising
a base support,
a cushion core element of resilient material secured to said base support,
an envelope structure of resilient material surrounding said base support and cushion element,
and fastener attachment components secured to said base support at intervals therealong,
said envelope structure including a synthetic rubber coating, said envelope structure also including a flexible fabric core cover interposed between said cushion core element and said coating.
4. A replaceable cushioning pad, according to claim 3, wherein said fabric is a loosely woven fabric mesh and wherein said coating is disposed in interpenetrating engagement with said mesh.
5. A replaceable cushioning pad, comprising
a base support,
a cushion core element of resilient material secured to said base support,
an envelope structure of resilient material surrounding said base support and cushion element,
and fastener attachment components secured to said base support at intervals therealong,
said base support comprising an elongated channel member with a web portion having said fastener components connected thereto and with laterally-spaced opposite edge flanges extending upward from said web portion into engagement with said cushion core element.

References Cited

UNITED STATES PATENTS

| 123,965 | 2/1872 | Willmot | 148—345.1 |
| 2,292,445 | 8/1942 | Hilldring | 248—345.1 |
| 2,606,755 | 8/1952 | Samuels | 248—345.1 |
| 2,821,941 | 2/1958 | Reed | 105—369 |
| 3,131,648 | 5/1964 | Seger | 105—369 |
| 3,173,826 | 3/1965 | Campbell et al. | 161—161 |

ROY D. FRAZIER, *Primary Examiner.*

JOHN PETO, *Examiner.*